United States Patent [19]
Sagorski

[11] 3,977,585
[45] Aug. 31, 1976

[54] DEMOILING APPARATUS

[75] Inventor: Peter A. Sagorski, Kansas City, Mo.

[73] Assignee: Ethyl Development Corporation, Kansas City, Mo.

[22] Filed: Mar. 14, 1975

[21] Appl. No.: 558,464

[52] U.S. Cl. .............................. 225/101; 83/914; 225/105; 425/806
[51] Int. Cl.² .......................................... B26F 3/00
[58] Field of Search ........... 225/100, 101, 102, 103, 225/105; 425/806; 264/161; 83/914

[56] References Cited
UNITED STATES PATENTS

| | | | |
|---|---|---|---|
| 2,945,117 | 7/1960 | Harris et al. | 83/914 X |
| 3,040,376 | 6/1962 | Elphee | 225/101 X |
| 3,172,590 | 3/1965 | Hulak | 225/101 |
| 3,231,956 | 2/1966 | Emmel | 425/806 X |

*Primary Examiner*—Othell M. Simpson
*Assistant Examiner*—Fred A. Silverberg
*Attorney, Agent, or Firm*—Donald L. Johnson; John F. Sieberth; Edgar E. Spielman, Jr.

[57] ABSTRACT

An apparatus is disclosed for demoiling hollow, blown, plastic articles. The apparatus features a holding assembly for holding the article so that movement of the article along its center axis is prevented, a moil gripping assembly which grips the moil, and a power mechanism for moving the moil gripping assembly away from the article and thus removing the moil from the article.

10 Claims, 6 Drawing Figures

DEMOILING APPARATUS

BACKGROUND OF THE INVENTION

In blowing of bottles or similar hollow, plastic articles, a tubular body of plastic material may be placed between two cooperating mold halves spaced from each other which are then closed to squeeze one end of the tubular body closed while the other end of the tubular body extends to the opening of the closed mold beyond the outer mold surface. A blowing nozzle is then inserted into the open flange end of the tubular body and compressed air is fed to the blowing nozzle into the interior of the tubular body to expand the body against the inner surface of the cavity formed in the mold.

That portion of the tubular body outside of the closed mold is excess and must be removed from the article. This can be achieved by providing the blowing nozzle with a cutter which will act against an anvil built into the blow mold halves to cut the excess portion of plastic from the article. This type of cutter-anvil apparatus is well known in the art and is used commercially. Even though the excess plastic, which is referred to in the art as a moil, is cut from the article there is a tendency for this excess plastic, or moil, to remain attached to the article. Removal of the still-attached moil is generally accomplished by hand. As can be appreciated, this hand-removal is expensive and time-consuming.

Therefore it is an object of this invention to provide an apparatus which will remove a moil from a hollow, blown, plastic article which apparatus accomplishes demoiling automatically.

The Invention

This invention relates to an apparatus for removing a moil from hollow, blown, plastic articles which apparatus comprises: a holding assembly for holding or grasping the article so as to offer resistance against movement of the article along its center axis; a moil gripping assembly adjacent to the holding assembly for gripping the moil; and a power mechanism connected to the moil gripping assembly for moving the assembly along a path substantially parallel to the center axis of the article and away from the article.

The apparatus of this invention, in its preferred form, has a holding assembly which features a powered pressing sub-assembly which acts to press the article down onto a surface and thus hold the article. In a further preferred form, the moil gripping assembly comprises a pair of cooperating jaws which open and close about the moil.

These and other features of the invention contributing satisfaction in use and economy in manufacture will be more fully understood from the following description of a preferred embodiment of the invention when taken in connection with the accompanying drawings, wherein identical numerals refer to identical parts and in which.

Figure 1:
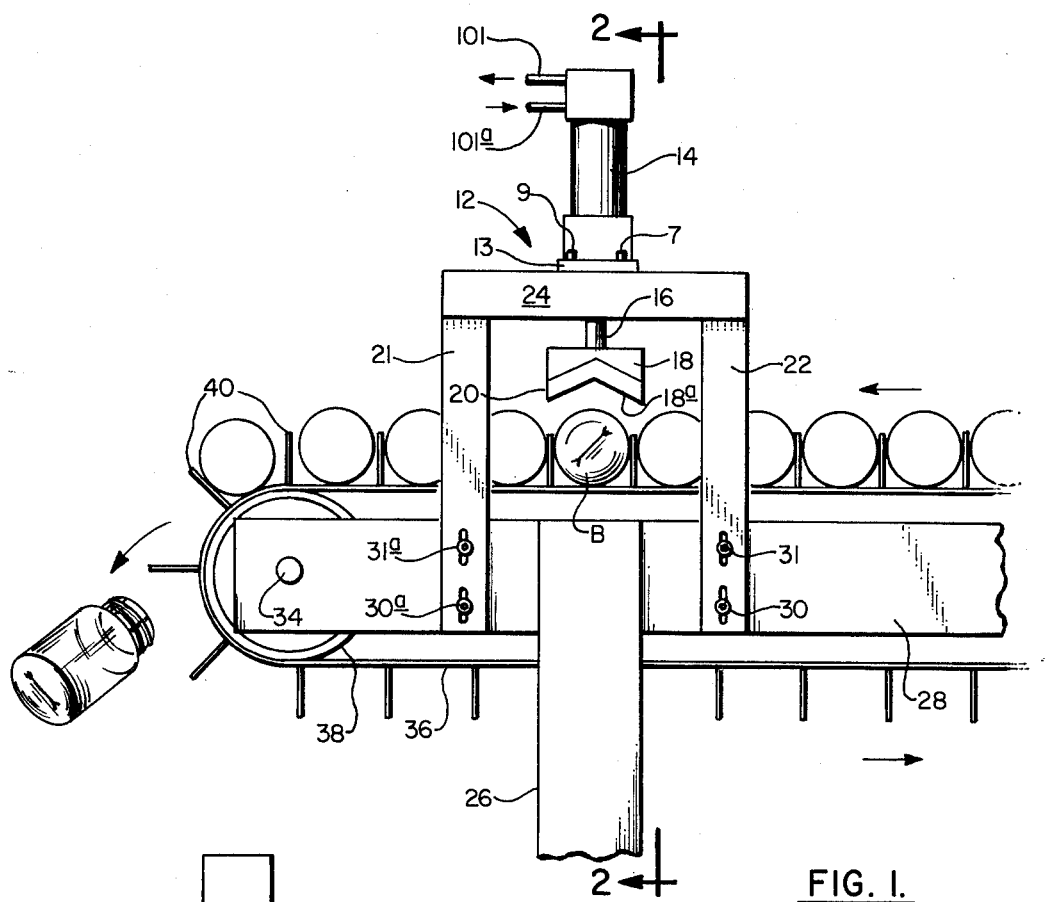
FIG. 1 is a side elevational view of an embodiment of this invention.

Referring now to FIGS. 1–4, it can be seen that a demoiling apparatus of this invention comprises a holding assembly, generally designated by the numeral 12, a moil gripping assembly generally designated by the numeral 10, and a power assembly generally designated by the numeral 6.

Holding assembly 12 includes two sub-assemblies, a sub-assembly for exerting a downward pressing force on bottle B and a second sub-assembly for providing a supporting surface upon which bottle B rests. The sub-assembly for providing a pressing force onto bottle B includes a double acting pneumatic cylinder 14 which is attached by rod 16 to plate 18. As can be seen from the drawings, plate 18 when viewed in side elevation has a surface 18a having an inverted V-shape. Preferably surface 18a is of a material which will not etch the surface of bottle B. Preferred surfaces are those of rubber, soft plastic, felt and the like. This surface can be provided by insert 20 made of this material and bonded to plate 18. It is to be understood that configurations other than an inverted V-shaped configuration are useful and may be preferable when demoiling articles having a different shape than that of bottle B.

To power pneumatic cylinder 14, compressed air is fed and exhausted from ports 101 and 101a.

The second sub-assembly provides a surface upon which bottle B rests. A preferred surface is, as shown in the drawings, a continuous conveyor belt. Conveyor belt 36 has partitions 40 which extend vertically from its surface. These partitions 40 are spaced apart a distance sufficient to accommodate bottle B. By utilizing partitions 40, maintenance of bottle B in a particular orientation is facilitated. Conveyor 36 rides over pulley 38 and is driven by a powered pulley which is not shown. Pulley 38 rotates about pulley axle 34. Pulley axle 34 is mounted, by way of conventional rotary bearings, to horizontal conveyor support members 28 and 28a. As shown in the drawings, vertical conveyor support members 26 and 26a are attached to horizontal conveyor support members 28 and 28a respectively for maintaining vertical position of the conveyor system and the pressing force sub-assembly.

By utilizing conveyor belt 36 it is possible to provide a surface which will facilitate demoiling a large number of bottles over a short period of time. It is to be understood, however, that other mechanisms may be used to provide a suitable surface for bottle B to rest upon. For example, a table having a pair of partitions into which articles may be placed one at a time is suitable for the purpose of this invention. It may be desirable in some instances to provide a plate having a V-shaped profile which would hold the article between the legs of the V.

Supporting the pressing force sub-assembly adjacent to the surface provided by conveyor belt 36 is a conventional framework comprising: left vertical frame members 21 and 22; right vertical frame members 21a and 22a; left horizontal frame member 24 which attaches to left vertical frame members 21 and 22; and right horizontal frame member 24a which attaches to right vertical frame members 21a and 22a. These attachments can be made by conventional means such as welding.

Left vertical frame members 21 and 22 and right vertical frame members 21a and 22a are, at their lower ends, adjustably carried by horizontal conveyor support members 28 and 28a respectively. This carriage is achieved via adjustable bolts and slots 30, 30a, 31 and 31a for horizontal conveyor support member 28 and by identical bolts and slots, not shown, for horizontal conveyor support member 28a. These adjustable bolts and slots allow for adjustment of the vertical position of the pressing force subassembly.

Connecting right and left horizontal frame members 24 and 24a is cross beam 13. As is seen in the figures, pneumatic cylinder 14 is supported by cross beam 13. Horizontal adjustable connections between cross beam 13 and right and left horizontal frame members 24 and 24a is achieved by the use of left bolts and slots 9 and 7 and right bolts and slots 9a and 7a respectively.

In the illustrated embodiment, moil gripping assembly 10 features a pair of cooperating moil gripping jaws. The top jaw includes top jaw arm 50 and top jaw face 51 while the bottom jaw includes bottom jaw arm 52 and bottom jaw face 53. As can be seen from the drawings, jaw faces 51 and 53 are connected at approximate right angles to jaw arms 50 and 52 respectively. Connected also to jaw arms 50 and 52 are sector gears 58 and 56 respectively. Sector gear 58 is attached to top jaw arm 50 by means of connecting bolts 69 and 71 while sector gear 56 is connected to bottom jaw arm 52 by connecting bolts 73 and 75. As can be seen in FIG. 2A, sector gears 58 and 56 intermesh one with the other. It can also be seen that sector gears 58 and 56 are mounted pivotally by means of sector gear pins 62 and 60 respectively. Sector gear pins 62 and 60 are mounted into side plates 49 and 49a. Side plates 49 and 49a are attached to back plate 33 to form a box-like housing. Also connected to side plates 49 and 49a is moil gripping double acting pneumatic cylinder 72. As can be seen in FIG. 2A, top jaw arm 50 is attached to rod 72a which is powered by moil gripping double acting pneumatic cylinder 72. This cylinder is carried by pneumatic cylinder pin 64 which mounts into sidewalls 49 anad 49a. As can also be seen from the drawings, return spring 66 is connected from side plate 49 by spring pin 65 to top jaw arm 50 by top spring pin 67. This spring is utilized to aid in returning the jaws to an open position.

Compressed air is fed and exhausted to jaw gripping double acting pneumatic cylinder 72 by means of inlet and outlet ports 102 and 102a.

Figure 4:
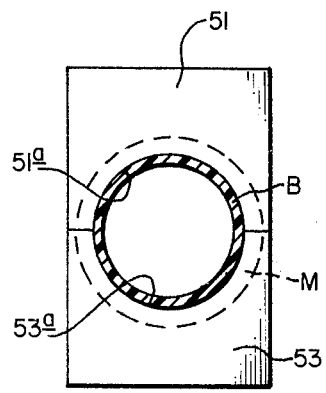
FIG. 4 is a sectional view taken along section lines 4—4 in FIG. 2A.

Referring now to FIG. 4, it can be seen that jaw faces 51 and 53 when in a closed position provide a space into which moil M fits. These spaces are provided by cuts 51a and 53a. It is preferred that the jaw faces are contoured so as to receive at least a portion of the outside surface of the moil so that removal of the moil is facilitated.

Moil faces 51 and 53 may, in some instances, still have moil M attached to one or the other even though the moil faces are separated from each other. This may arise when the moil face contours closely fit the contours of moil M. To remove moil M, in these instances, from the moil faces various methods may be used. For instance, compressed air may be fed to the moil faces with a port communicating the compressed air to the moil so that when the moil sticks compressed air can be turned on to blow it off of the jaw face. Another method which may be used to remove the moil from the moil face is to rotate the moil jaws so that the moil would simply fall out due to gravity.

Providing motion of the moil gripping assembly towards and away from bottle B is power assembly 6. Power assembly 6 is connected to back wall 33 and thus to moil gripping assembly by means of rod 68. Rod 68 is in power communication with double acting pneumatic cylinder 70. Compressed air is fed and exhausted from double acting pneumatic cylinder 70 by means of outlet and inlet ports 103 and 103a. Supporting double acting cylinder 70 in position is a support structure having horizontal member 80 and vertical members 82 and 84 as is shown in FIGS. 2A and 2B.

Figure 2:
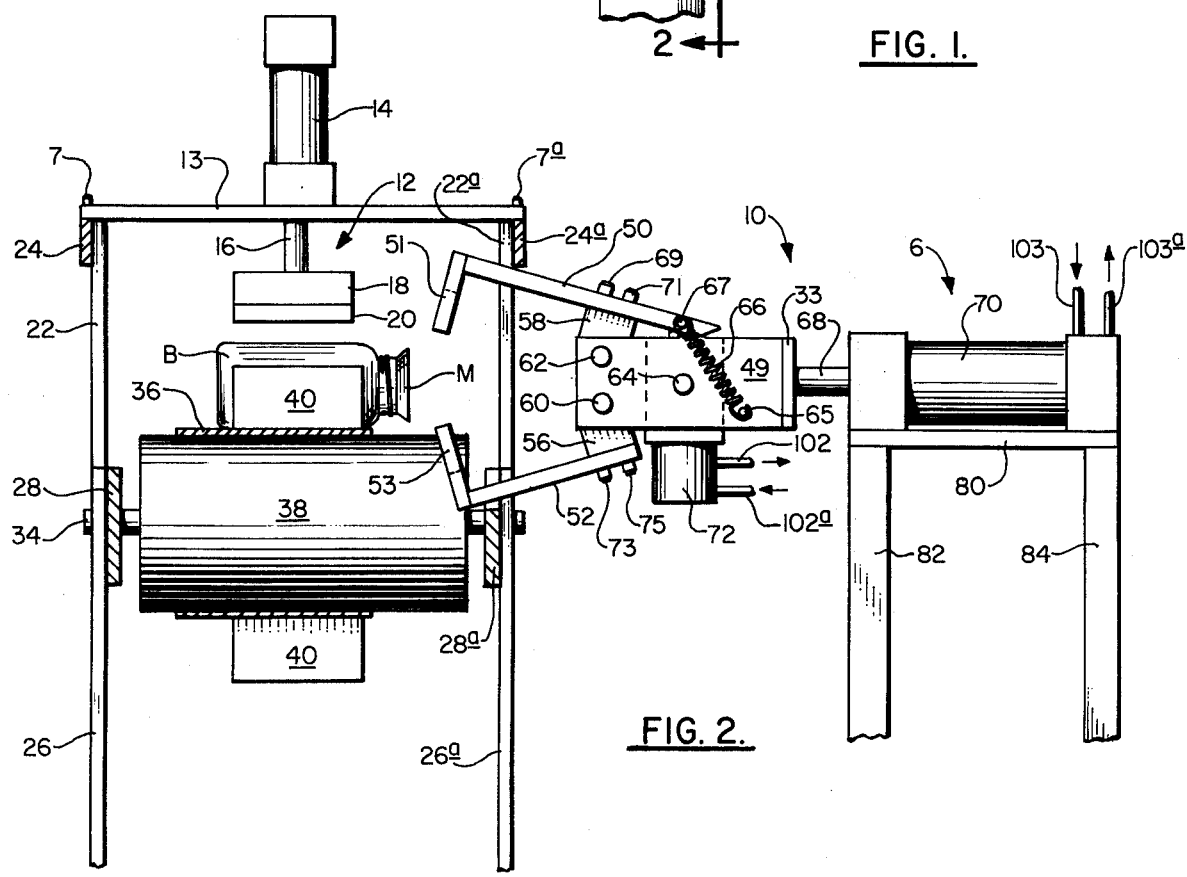
FIG. 2 is a sectional view taken along section lines 2—2 of FIG. 1.
Figure 3:
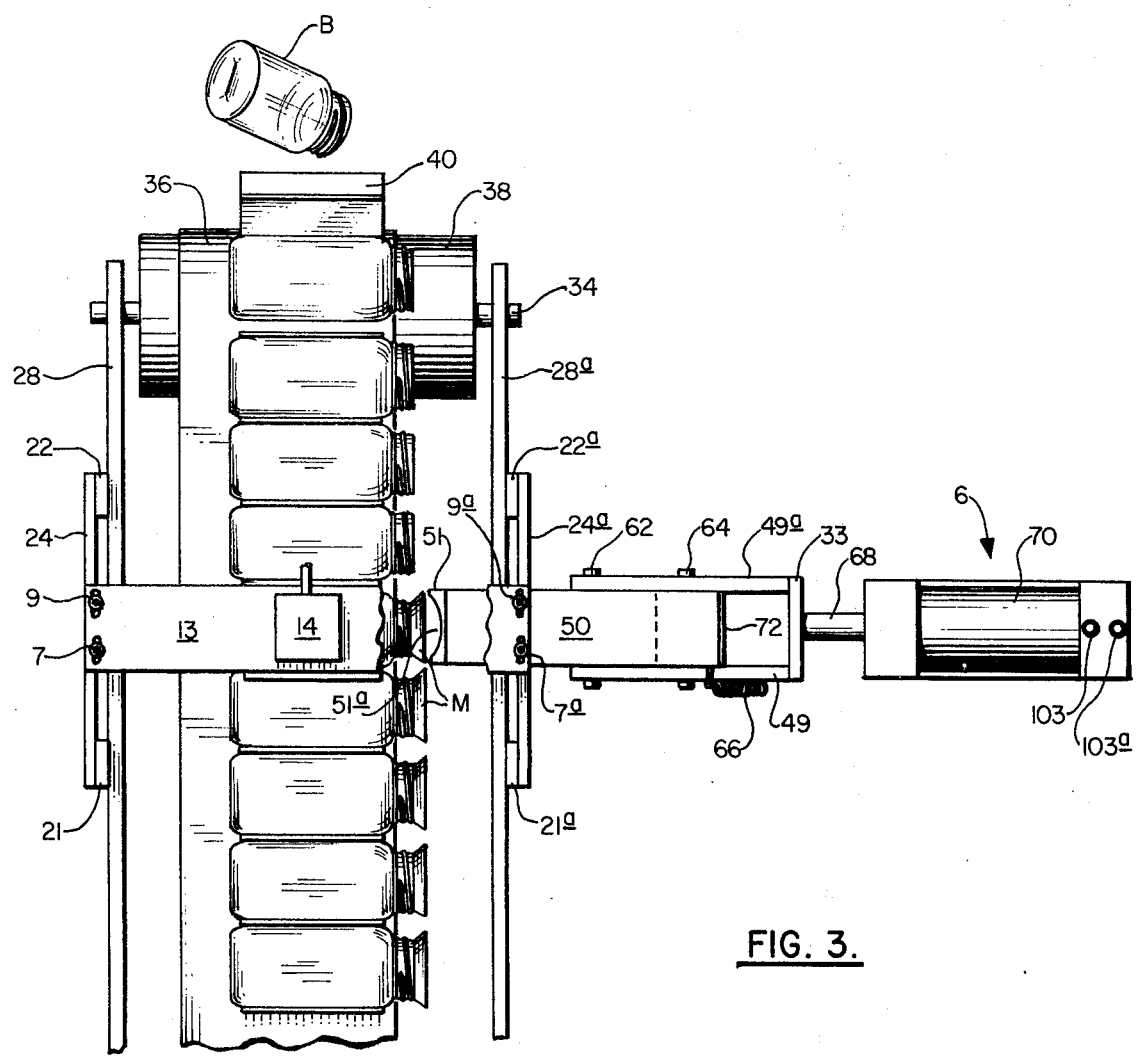
FIG. 3 is a top, partially broken away, view of the apparatus shown in FIG. 1.
Figure 2A:
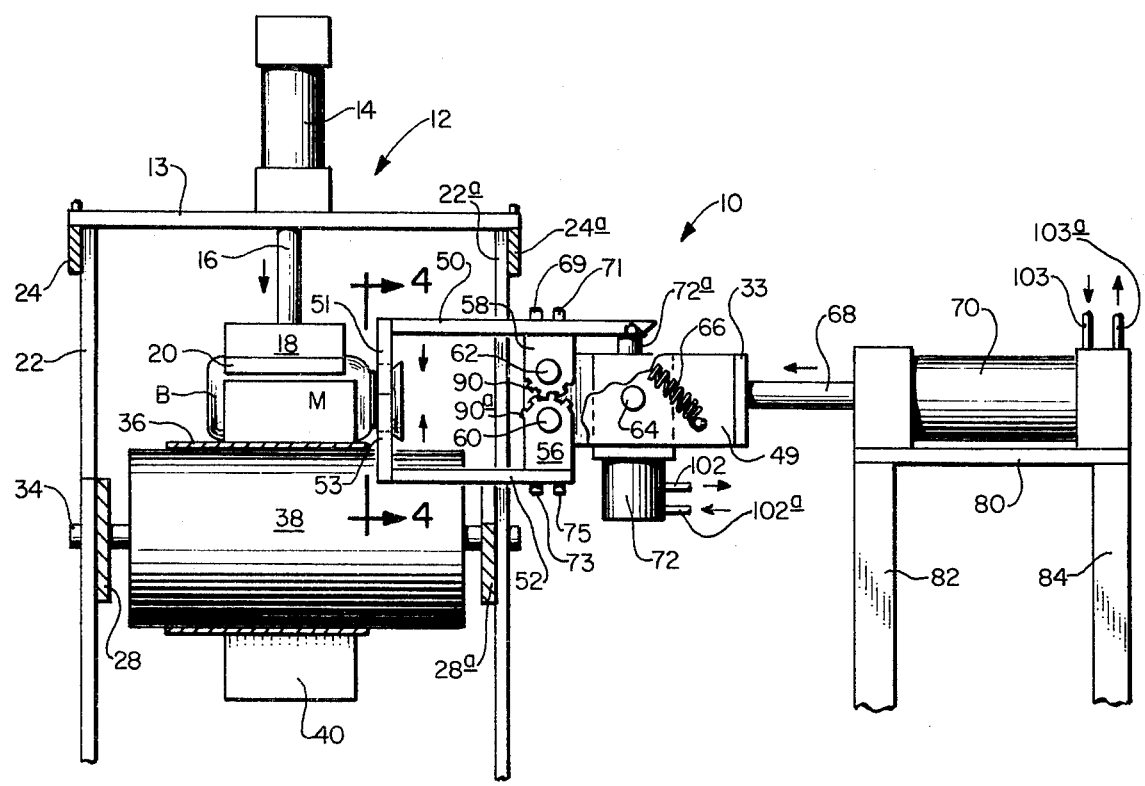
FIG. 2A is a sectional view taken along section lines 2—2 of FIG. 1 showing the apparatus with the jaws in the closed position.
Figure 2B:
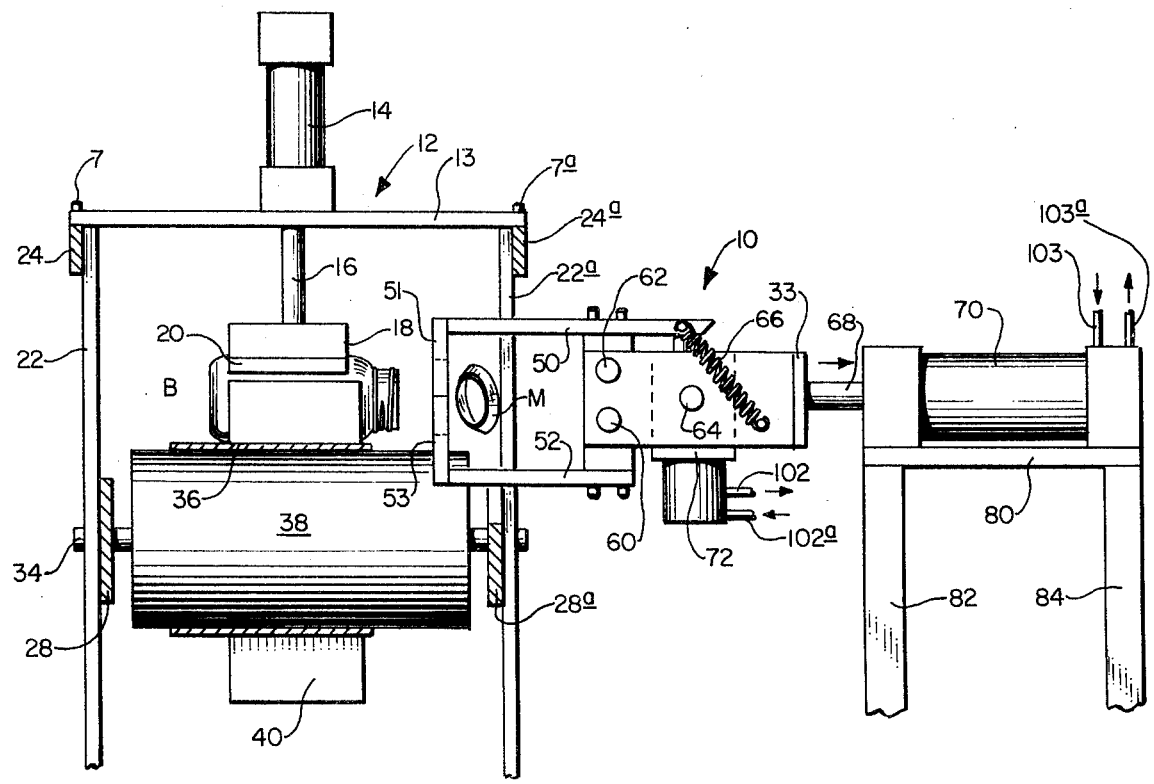
FIG. 2B is a sectional view taken along section lines 2—2 of FIG. 1 showing the apparatus with the jaws in the closed position and the jaws being retracted from the bottle.

Reference is now had to FIGS. 2, 2A and 2B which illustrate the apparatus of this invention in operation. As can be seen in FIG. 2, jaw faces 51 and 53 are apart and moil gripping assembly 10 is in a retracted position away from bottle B. Also it should be noted that plate 18 is in the "UP" position and is not in contact with bottle B. Upon arrival of bottle B at the appropriate position beneath plate 18, conveyor belt 36 is stopped. At this time air is fed to double acting pneumatic cylinder 14 which forces plate 18 to press down upon bottle B. Subsequent to this double acting pneumatic cylinder 70 is actuated by compressed air causing rod 68 to move and push moil gripping assembly 10 forward whereby jaw faces 50 and 53 will be adjacent to moil M. After this position has been reached, pneumatic cylinder 72 is actuated whereby rod 72a pushes up against jaw arm 50 causing jaw arm 50 to move down and sector gear 58 to rotate. Sector gear 58, being in cooperation with sector gear 56, causes sector gear 56 to rotate causing bottom jaw arm 52 to move in closing relationship with top jaw arm 50. Jaw faces 51 and 53 will then be in contact with moil M.

FIG. 2B illustrates the last step of the demoiling procedure whereby double acting pneumatic cylinder 70 is actuated so that rod 68 is retracted thus retracting moil gripping assembly 10 and pulling moil M from bottle B. At this point plate 18 is retracted, the moil gripping jaws are opened and conveyor belt 36 is moved, putting a fresh bottle with moil into position for repeat of the sequence.

The apparatus of this invention is to be in no way construed as being limited to the above-described preferred embodiment. For example, the prior-described moil gripping jaws may be substituted by equivalent moil gripping apparatuses. Likewise, for the pressing force sub-assembly. The purpose of the pressing force sub-assembly is to hold the bottle whereby movement thereof is prevented when the moil is pulled from the bottle. Other equivalent mechanisms could be used. For example, instead of applying a pressing force onto the bottle, the bottle can be prevented from moving by providing a plate which would block the bottle from moving. For example, the plate could encircle the neck of the bottle thereby preventing bottle movement as the neck is of smaller diameter than the rest of the bottle.

I claim:

1. An apparatus for removing a moil from a hollow, blown, plastic article which comprises:
    a. holding means for grasping said article to resist movement of said article along its center axis;
    b. a moil gripping means adjacent to said holding means for gripping said moil, said moil gripping means comprising, i. a pair of cooperating jaws each having an elongated jaw arm and a jaw face attached adjacent to one end of said arm and ii. a jaw power means attached to at least one of said jaw arms for opening and closing said jaws wherein said jaw arm attached to said power means has a first sector gear which intermeshes with a second sector gear attached to said other jaw arm whereby power applied by said jaw power means to said jaw arm attached thereto is transmitted to said other jaw arm causing said jaws to open and close; and c. power means connected to said moil gripping means for moving said moil gripping means along a path substantially parallel to said center axis and away from said article.

2. The apparatus of claim 1 wherein said holding means comprises a supporting surface onto which said article rests and a powered pressing means for applying a force on said article in a direction towards said surface.

3. The apparatus of claim 2 wherein said powered pressing means is a plate which is powered by a double acting pneumatic cylinder attached thereto.

4. The apparatus of claim 3 wherein said plate has an inverted V-shaped surface which presses against said article.

5. The apparatus of claim 2 wherein said supporting surface is a continuous conveyor belt.

6. The apparatus of claim 1 wherein said holding means comprises a supporting surface onto which said article rests and a powered blocking means which, when engaging said article, is in blocking conformance with at least a portion of the outside contours of said article.

7. The apparatus of claim 1 wherein said jaw power means is a double acting pneumatic cylinder.

8. The apparatus of claim 1 wherein each jaw face is contoured so as to enclose at least a portion of said moil.

9. The apparatus of claim 1 wherein said power means is a double acting pneumatic cylinder.

10. The apparatus of claim 1 wherein said moil is a neck moil and said article is a container having a neck.

* * * * *